2,996,522
6α-FLUOROMETHYL ALLOPREGNANES

Alexander L. Nussbaum, Leonia, N.J., assignor to Schering Corporation, Bloomfield, N.J., a corporation of New Jersey
No Drawing. Filed July 29, 1960, Ser. No. 46,061
4 Claims. (Cl. 260—397.3)

This invention relates to a new series of therapeutically active steroids. More particularly, this invention is concerned with novel 6α-fluoromethyl steroids which are capable of lowering the cholesterol level in the blood, with the process for the preparation of these compounds and with novel intermediates which may be readily converted to these and other valuable steroid compounds.

The exact relationship which exists between the level of cholesterol in the blood and the incidence of circulatory disease is not yet precisely understood. It appears, however, that where high levels of cholesterol are found in the blood, there is also a tendency toward circulatory disease. Although "low-cholesterol diets" have been employed to lower blood cholesterol levels, the use of chemotherapeutic agents is greatly preferred. The compounds of this invention possess the valuable property of lowering blood cholesterol levels without objectionable side effects. These compounds, therefore, may serve as useful therapeutic agents in the treatment of circulatory disease.

The novel compounds of this invention may be represented by the following general formula:

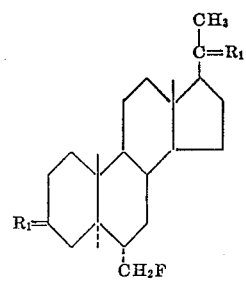

wherein $R_1$ may be

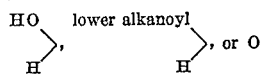

Particularly desirable, is the compound wherein $R_1$ is O.

As the starting material in the preparation of the compounds of this invention, one may employ 6α-hydroxymethyl-allopregnane-3β,20β-diol 3,20-diacetate (II) which can be readily prepared according to the method described in my copending application Serial No. 12,251, filed March 2, 1960, by subjecting 3β,20β-diacetoxy-5-pregnene (I) to the action of a gaseous mixture of carbon monoxide and hydrogen at high pressure and elevated temperature in the presence of a catalyst such as dicobalt octacarbonyl.

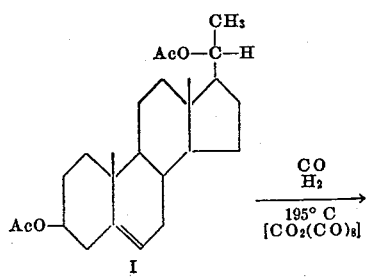

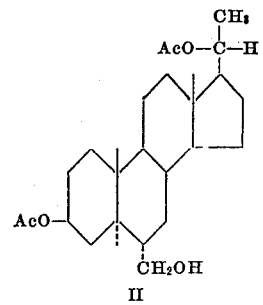

Compound II is then treated with p-toluenesulfonyl chloride and the resulting tosylate (III) is converted to 6α-iodomethyl-allopregnane - 3β,20β - diol 3,20-diacetate (IV) by reaction with sodium iodide. The 6α-iodomethyl derivative, which may be used in crude form, is converted to the corresponding fluoride (V) by means of silver fluoride in aqueous acetonitrile.

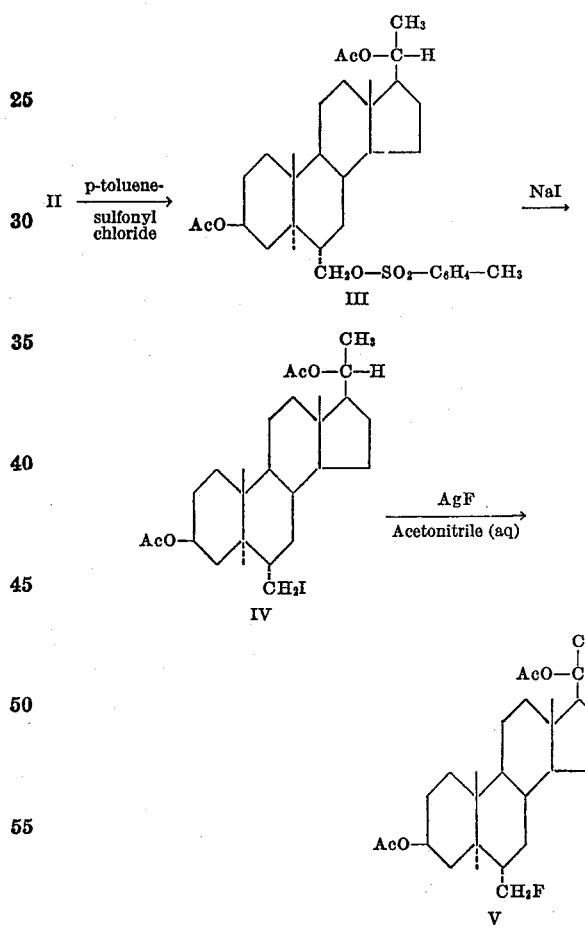

The conversion of the iodide to the fluoride as described above is surprising since attempts to convert the corresponding chloride in this manner gave back the starting material. The conversion requires more drastic conditions than the corresponding reaction at C-21 of iodides activated by the neighboring keto group at C-20. It was found that the best results were obtained when the silver fluoride reagent was freshly prepared in situ.

Alternatively, the 6α-iodomethyl intermediate (IV) may be obtained by direct conversion of the alcohol (II), Accordingly, compound II is refluxed with triphenyl phosphite methiodide in anhydrous ether. Extraction of the resulting reaction mixture with aqueous sodium hydroxide followed by drying and chromatographic separation on Florisil with a benzene eluate, gives the desired iodide.

The 6α-fluoromethyl diacetate (V) is readily converted to the corresponding diol (VI) by treatment with methanolic potassium hydroxide. Oxidation of the latter compound with Kiliani acid (e.g. 26.72 g. of chromic oxide and 23 ml. of concentrated sulfuric acid made up to 100 ml. with water) gives the dione (VII).

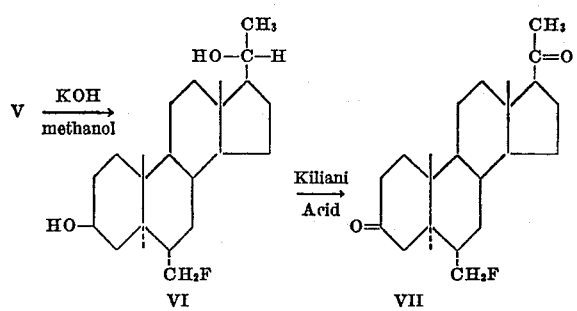

The following examples more fully illustrate the preparation of the compounds of this invention.

EXAMPLE I

*6α-iodomethyl-5α-pregnane-3β,20β-diol 3,20-diacetate*

A. *From 6α-hydroxymethyl 5α-pregnane-3β,20β-diol, 3,20-diacetate.*—Triphenyl phosphite methiodide is prepared after the manner of Landauer and Rydon by allowing 25.1 ml. of triphenyl phosphite and 7.7 ml. of methyl iodide to interact for 36 hours at reflux temperature. The resulting solid is covered with 600 ml. of anhydrous ether, and 9.9 g. of 6α-hydroxymethyl-5α-pregnane-3β,20β-diol, 3,20-diacetate are added. The resulting solution is refluxed for 90 minutes and then allowed to stir overnight at room temperature. The decanted solution is extracted with 5% aqueous sodium hydroxide solution and washed with water, dried over sodium sulfate and concentrated to a red oil. Chromatography on 400 g. of Florisil gives 5.7 g. of solid material from the benzene eluates. This crude 6α-iodomethyl-5α-pregnane-3β,20β-diol 3,20-diacetate could be used directly in the next step.

For characterization, a small amount is recrystallized from acetone-hexane to analytical purity, M.P. 152–154° C.

Calcd. for $C_{26}H_{41}O_4I$: I, 23.31, found: 22.98.

B. *From 6α-tosyloxy-allopregnane-3β,20β-diol 3,20-diacetate.*—6α-tosyloxy-allopregnane - 3β,20β - diol 3,20-diacetate is prepared by dissolving 3.9 g. of 6α-hydroxymethyl-allopregnane-3β,20β-diol 3,20-diacetate in 60 ml. of freshly distilled pyridine which is cooled to 0° C. To this solution, 8.6 g. of p-toluenesulfonyl chloride is added and the resulting solution is allowed to stand overnight. It is then poured into a solution of 1.4 l. of water and 70 ml. of concentrated hydrochloric acid. The mixture is extracted with ether, and the extract washed with aqueous sodium bicarbonate and water, dried, and concentrated. Crystallization from hexane gives 3.16 g. of the tosylate, M.P. 167–169° C.

The tosylate (100 mg.) is dissolved in 20 ml. of acetone and 250 g. of sodium iodide is added. The mixture is refluxed for 3 hours, concentrated in vacuo to a small volume and diluted with water. The resulting oil is extracted with methylene chloride, the extract washed with water and dried over sodium sulfate, concentrated and crystallized from hexane to give 67 ml. of the iodo derivative which is identical in infra-red spectrum with the mixtures described above.

EXAMPLE II

*6α-fluoromethyl-5α-pregnane-3β,20β-diol 3,20-diacetate*

Silver nitrate (115 g.) is dissolved in a minimum of water and added to a solution of 28 g. of sodium hydroxide in 600 ml. of water. The resulting silver oxide is filtered, dried well and added to 28.3 ml. of 48% aqueous hydrofluoric acid and 29 ml. of water in polyethylene beaker. The resulting suspension is stirred for ½ hour and then filtered into a reaction vessel wrapped in aluminum foil and containing 900 ml. of acetonitrile and 106 ml. of water. To the white suspension, a solution of 4.0 g. of iodosteroid in 60 ml. of acetonitrile was added. The immediate formation of a brown precipitate is observed. The suspension is refluxed for 1½ hours and then allowed to stand overnight. Filtration through Supercel and simultaneous charcoal treatment are followed by concentration in vacuo to a small volume and extraction with methylene chloride. The resulting organic extract is washed with aqueous ammonium hydroxide, sodium thiosulfate and water, dried and concentrated. The residual oil is chromatographed on 60 g. of Florisil. The benzene eluates give 1.25 of crude 6α-fluoromethyl-5α-pregnane-3β,20β-diol 3,20-diacetate. Crystallization from hexane gives 787 mg., M.P. 172–175° C. An analytical sample is prepared by repeated recrystallization from isopropyl ether, M.P. 175–177° C.

*Analysis.*—Calcd. for $C_{26}H_{41}O_4F$: C, 71.52; H, 9.48; F, 4.35. Found: C, 71.47; H, 9.48; F, 4.2.

Further eluates with 10% ether-benzene gives 195 mg. of 6α-hydroxymethyl-5α-pregnane-3β,20β-diol 3,20-diacetate, the starting material.

EXAMPLE III

*6α-fluoromethyl-5α-pregnane-3β,20β-diol*

The foregoing diacetate is saponified by refluxing for 3 hours in 45 ml. of 5% methanolic potassium hydroxide. The solution is neutralized with glacial acetic acid and concentrated to a small volume. Addition of water and filtration give 193 mg. of the diol. Recrystallization from acetone-hexane gives an analytical sample, M.P. 199–201° C.

*Analysis.*—Calcd. for $C_{22}H_{26}O_2F$: C, 75.00; H, 10.51. Found: C, 75.08; H, 10.20.

EXAMPLE IV

*6α-fluoromethyly-5α-pregnane-3,20-dione*

The fluorodiol is dissolved in 40 ml. of distilled acetone and titrated to a permanent brown color with 8 N Kiliani acid. Dilution with 200 ml. of ice water precipitates out the steroidal dione. Filtration gives 145 mg. of crude product. Recrystallization from acetone-hexane gives an analytical sample, M.P. 136–137° C.

*Analysis.*—Calcd. for $C_{22}H_{33}O_2F$: C, 75.85; H, 9.54. Found: C, 75.51; H, 9.30.

EXAMPLE V

*6α-chloromethyl-5α-pregnane-3β,20β-diol 3,20-diacetate*

6α-hydroxymethyl-5α-pregnane-3β,20β-diol 3,20-diacetate (1.0 g.) is dissolved in 12 ml. of pyridine and treated with 2.1 g. of p-toluenesulfonyl chloride. The solution is refluxed for three hours, poured into excess ice water, and the resulting solid is filtered and washed with water until free of pyridine. After air-drying, the product has M.P. 180–185 (previous transition in the 170's), weight 383.3 mg. Recrystallization from methanol gives an analytical sample, M.P. 186–187.5° C. (α), +45.0 (CHCl₃).

*Analysis.*—Calcd. for $C_{26}H_{41}O_4Cl$: C, 68.92; H, 9.12; Cl, 7.83. Found: C, 69.24; H, 9.00; Cl, 7.99.

I claim:
1. A compound selected from the group consisting of allopregnanes of the formula:

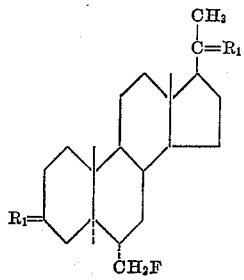

wherein $R_1$ is a substituent selected from the group consisting of $$\begin{matrix}HO\\H\end{matrix}\Big\rangle, \begin{matrix}\text{lower alkanoyl}\\H\end{matrix}\Big\rangle \text{ and } O$$

said substituent being identical at C–3 and at C–20.

2. The compound 6α-fluoromethyl-allopregnane-3β,20β-diol 3,20-diacetate.
3. The compound 6α-fluoromethyl-allopregnane-3β,20β-diol.
4. The compound 6α-fluoromethyl-allopregnane-3,20-dione.

No references cited.